UNITED STATES PATENT OFFICE.

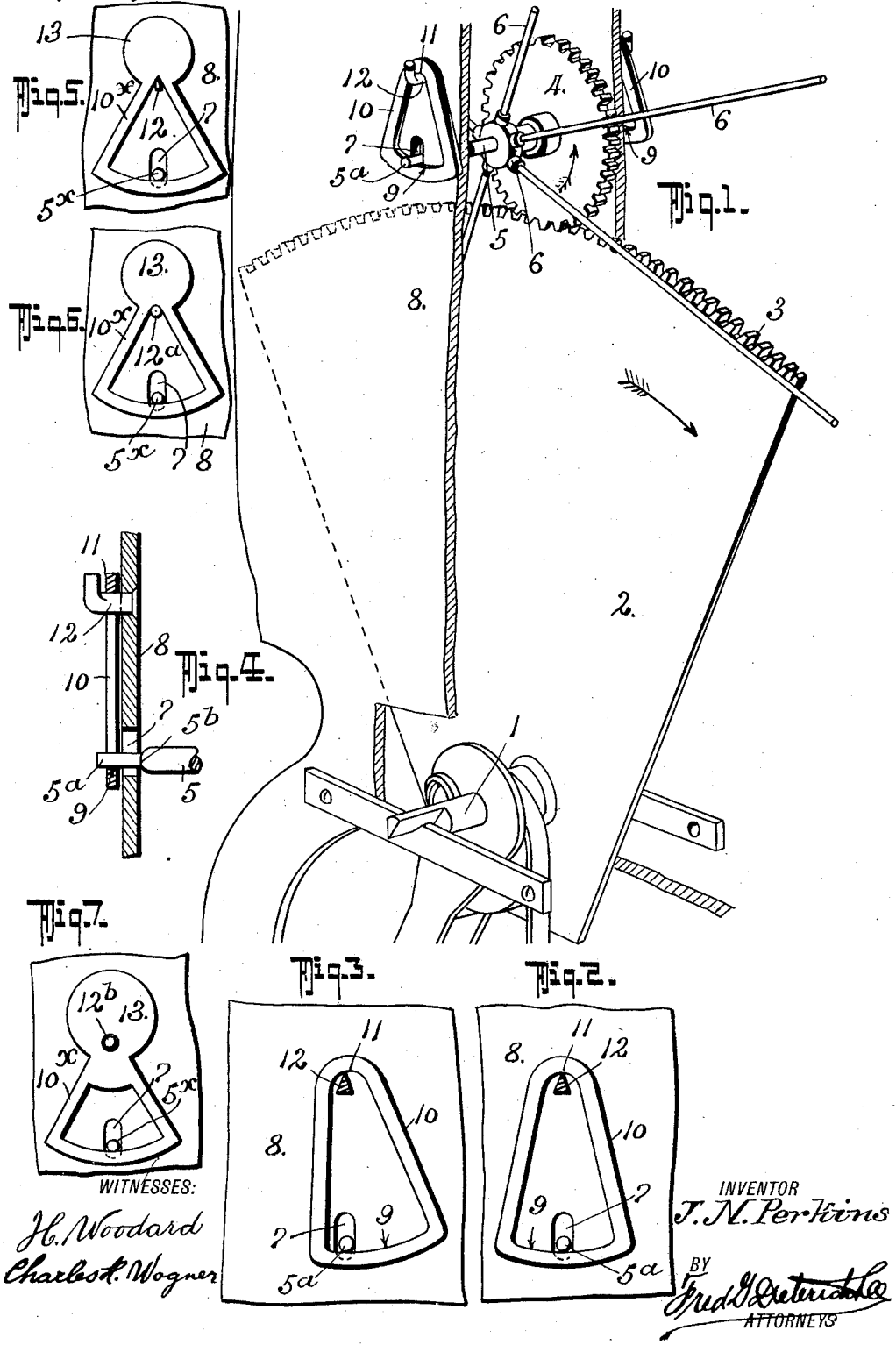

JOHN NICHOLAS PERKINS, OF RICHMOND, VIRGINIA, ASSIGNOR TO RICHMOND SCALE CO., INCORPORATED, OF RICHMOND, VIRGINIA.

BEARING FOR INDICATOR-SHAFTS.

1,006,676.            Specification of Letters Patent.          Patented Oct. 24, 1911.

Application filed February 13, 1911. Serial No. 608,253.

*To all whom it may concern:*

Be it known that I, JOHN N. PERKINS, residing in Richmond, in the county of Henrico and State of Virginia, have invented a new and Improved Bearing for Indicator-Shafts, of which the following is a specification.

My invention relates to certain new and useful improvements in bearings and it is more particularly designed for use as a bearing in connection with automatic computing scales and the like in which the scale or dial is carried by a rotatable shaft. The rotatable shaft in scales of this type is usually driven by a pull cable and counterweight. I have, however, designed a scale of this type in which the shaft is turned by a sector meshing with a pinion on the shaft. In a scale of this character considerable lateral thrust is provided. It is to provide a bearing that is especially adapted for this construction of scale that my present invention has been devised.

This invention consists essentially in providing two rigid supports having vertical slots or openings of greater area than the cross sectional area of the shaft, through which supports the bearing ends of the shaft, that carries the indicator dial, projects. The bearing ends of the shaft rest on the stirrups which are swung from suitable pivots and each has that surface which contacts the shaft, curved on an arc whose center is the pivot bearing of the stirrup, the length of the stirrup bearing surface being in excess of the circumference of the bearing portion of the shaft.

In its more subordinate nature, the invention includes those novel features of construction, combination and arrangement of parts, all of which will be first fully described, then be specifically pointed out in the appended claim and illustrated in the accompanying drawings, in which :—

Figure 1, is a perspective view of a part of a scale embodying the invention. Fig. 2, is a detail elevation of one of the stirrups and bearings in the position the parts assume while the scale is at rest. Fig. 3, is a view similar to Fig. 2 showing the position of the parts when moving from "zero" position to "weighing" position. Fig. 4, is a detail vertical cross section of the device shown in Fig. 1. Figs. 5, 6, and 7 are face views of other forms of stirrups.

Referring now to the accompanying drawing, in which like letters and numbers of reference indicate like parts in all the figures, 1 designates the shaft of the differential balance mechanism of a scale, on which shaft the gear sector 2 is mounted, the sector 2 has its gear face 3 designed to mesh with the pinion 4 of the indicator chart shaft 5. The chart carrier 6 is mounted on the shaft 5 which shaft in practice is designed to make one complete revolution from the zero to the maximum indication of the chart (not shown). The shaft 5 projects through an opening 7 in each of the standards 8 and rests on the bearing surfaces 9 of the stirrups 10, one of which is at each end of the shaft, and the stirrups 10 have bearing portions 11 to rest on the knife edges 12, as clearly indicated in the drawing. The projecting portion of $5^a$ of the shaft 5 is reduced slightly in diameter to leave a rounded shoulder $5^b$ that prevents longitudinal movement of the shaft in its bearings by engaging the supports 8, should a tendency to longitudinal motion occur. It will also be observed that the area of the opening 7 in the supports is of greater width and length than the diameter of the shaft ends $5^a$ so that the shaft ends $5^a$ may hang freely in such opening 7 without contacting the walls thereof, when the scale is at rest or when the scale is turned to indicate the proper weight or value, and is vibrating at the limit of its movement just before coming to a rest so that there will be little or no friction between the shaft ends $5^a$ and the standards 8.

When the scale is at rest, the parts are relatively positioned as indicated in Fig. 2 by reference to which it will be seen the knife edge bearing of the stirrup 10 is directly over the center of the shaft ends $5^a$. Now, when an article to be weighed is put on the scale pan (not shown) the gear sector 2 is turned in the direction of the arrow in Fig. 1 thus turning the pinion 4 in the direction of the arrow in Fig. 1, which imparts a lateral thrust from left to right in Fig. 3 which tends to move the shaft 5 bodily laterally. This movement is limited by contact between the shaft ends $5^a$ and the walls of the openings 7 (see Fig. 3). As soon, however, as the movement of the pinion 4 has been started, the lateral thrust will reduce, gradually becoming *nil*, thereby permitting the shaft 5 to again become centralized and directly beneath the knife edge 12, with its ends 5ᵃ out of contact with the walls of the openings 7. As the sector 2 reaches the limit of its movements and vibration ceases, the shaft ends 5ᵃ will rest in the opening 7 out of contact with the side walls thereof and directly beneath the knife edge 12 at which time the stirrups 10 will be in a position similar to that indicated in Fig. 3 of the drawings.

If desired the sectors 10 may be counter weighted as at 13 (see Figs. 5 to 7) and instead of employing knife edge bearings 12 around bearing 12ᵃ (see Fig. 6) or a simple shaft like bearing 12ᵇ (Fig. 7) may be used.

It will be observed that by my construction of bearing extreme sensitiveness is obtained at the particular time at which it becomes most necessary, namely, at the time the scale with its goods arrives at its weight indicating position and the sector 2 oscillates or vibrates from side to side, coming to a rest at the proper indication.

From the foregoing taken in connection with the accompanying drawings, the complete construction, arrangement and advantages of my invention will be readily apparent.

What I claim is:

In a scale, a chart shaft, a gear sector carrying shaft, a pinion on said chart shaft and meshing with said gear sector whereby the motion of the gear shaft will be imparted to the chart shaft, a pair of relatively fixed supports having openings through which the ends of said chart shaft project, said chart shaft having reduced ends to leave shoulders, stirrups having curved bearing surfaces on which the ends of said chart shaft rest, said stirrup bearing surfaces being of greater length than the circumference of the shaft ends, pivot bearings on which said stirrups hang, the curvature of the bearing surface of said stirrups having as their radii the pivot bearing points.

JOHN NICHOLAS PERKINS.

Witnesses:
J. C. KENT,
ROBT. N. POLLARD.

---

Copies of this patent may be obtained for five cents each, by addressing the "Commissioner of Patents, Washington, D. C."